United States Patent [19]

Ware, Jr. et al.

[11] 4,422,236

[45] Dec. 27, 1983

[54] METHOD OF EXTRUDING PARTS WITH CAPTURED FIXTURE

[75] Inventors: James K. Ware, Jr.; Edward O. Wolcott, both of Gainesville, Fla.

[73] Assignee: General Electric Company, Gainesville, Fla.

[21] Appl. No.: 307,696

[22] Filed: Oct. 1, 1981

[51] Int. Cl.³ .............................................. H01R 43/00
[52] U.S. Cl. ..................... 29/876; 29/283.5; 29/520; 411/107; 411/121; 403/282; 429/178; 72/358
[58] Field of Search ...................... 29/520, 283.5, 876, 29/874; 72/354, 358; 403/282; 411/107, 121, 103, 176; 429/178

[56] References Cited

U.S. PATENT DOCUMENTS

| | | | |
|---|---|---|---|
| 1,213,878 | 1/1917 | Jacocks | 72/354 |
| 1,410,093 | 3/1922 | Dallmeyer et al. | 72/356 |
| 2,932,290 | 4/1960 | Christensen | 29/520 X |
| 2,955,222 | 10/1960 | Beesch | 29/520 X |
| 3,197,857 | 8/1965 | Nippert | 29/480 |
| 3,345,736 | 10/1967 | Jakeway | 403/282 X |
| 3,583,198 | 6/1971 | Drallmeier | 72/358 |
| 3,699,636 | 10/1972 | Walker | 403/282 X |
| 3,731,516 | 5/1973 | Dohmann | 72/354 |
| 3,750,442 | 8/1973 | Cogan | 72/354 |
| 3,820,579 | 6/1974 | Barry | 403/282 X |
| 4,166,373 | 9/1979 | Braun | 72/356 |
| 4,177,665 | 12/1979 | Schurmann | 72/354 X |

FOREIGN PATENT DOCUMENTS

| | | | |
|---|---|---|---|
| 120509 | 11/1945 | Australia | 29/520 |
| 745517 | 2/1956 | United Kingdom | 29/520 |
| 803015 | 10/1958 | United Kingdom | 29/520 |

*Primary Examiner*—Charlie T. Moon
*Attorney, Agent, or Firm*—Henry J. Policinski

[57] ABSTRACT

An improved apparatus and a method are disclosed for extruding an improved type of small part of the type having a body portion (12) of extrudable material and a fixture (18, 20; 54, 56) of harder material capatured at the surface of the body. A female die element (22, 24) is provided with a bore (26) which extends into a downwardly opening cavity (28) having a geometry corresponding to the desired geometry of the body portion of the part. A male die member (36) is positioned within the bore and includes at its lower end a threaded socket (50) or protrusion (52) for holding the fixture of harder material during extrusion. Thus, when a billet of extrudable material (48) is placed in the cavity and the male die member is moved downward, the material extrudes around a portion of the fixture held at the lower end of the male die element.

1 Claim, 6 Drawing Figures

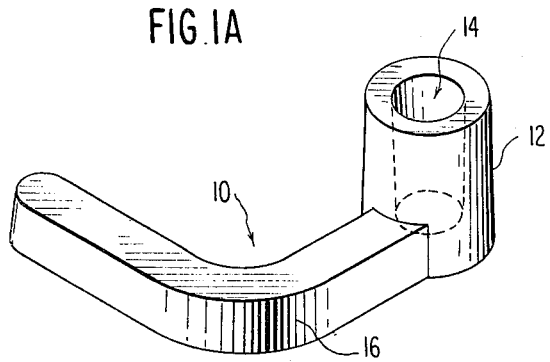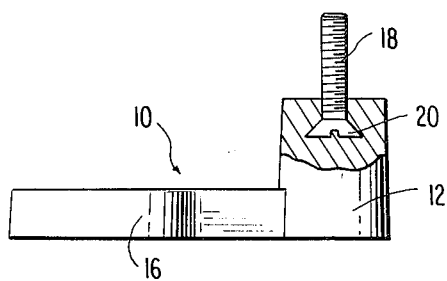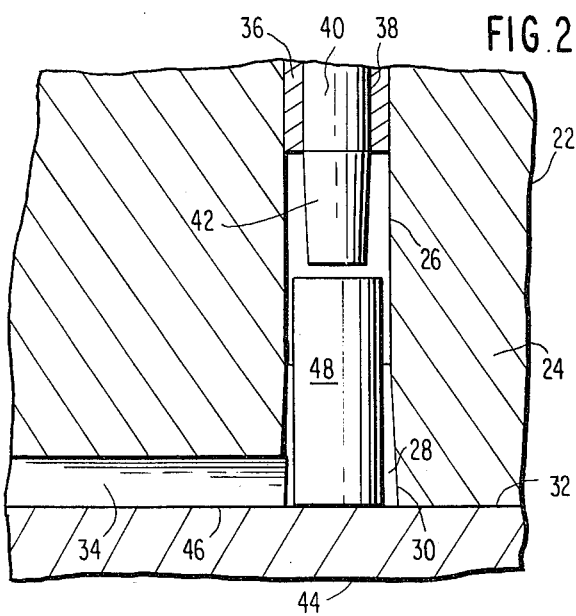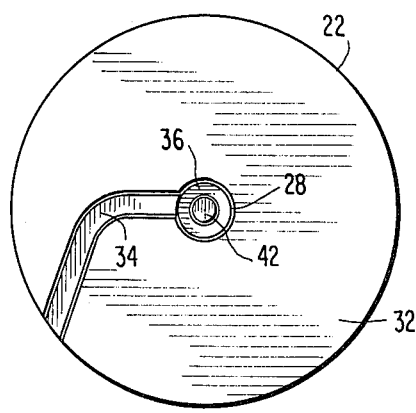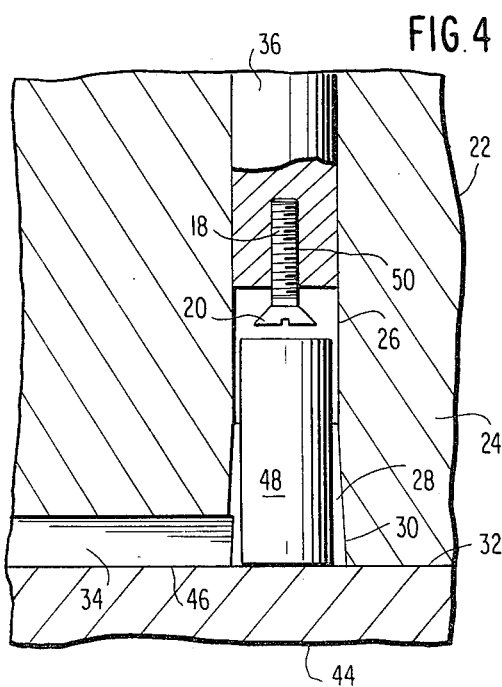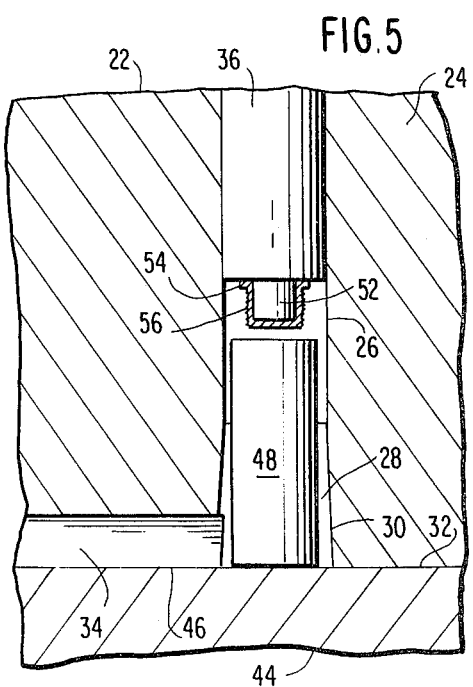

METHOD OF EXTRUDING PARTS WITH CAPTURED FIXTURE

CROSS REFERENCE TO RELATED APPLICATION

This application is related to an application entitled Method and Apparatus for Extruding Parts, Ser. No. 307,697, and filed concurrently herewith on Oct. 1, 1981, by James K. Ware, Jr., and Edward O. Wolcott, and also commonly assigned.

DESCRIPTION

1. Technical Field

The present invention concerns improved apparatuses and methods for manufacturing parts by cold or hot extrusion.

2. Background Art

In the art of manufacturing lead-acid batteries, the grids and terminal parts have for many years been made from lead which has been alloyed with various materials and improve its strength. Traditionally, parts made from such alloys have been cast, though in some instances expanded or punched metal grids have been used. Cast parts tend to be rather porous, a characteristic which can lead to unwanted leakage past the cast terminal posts of the battery. To eliminate or greatly reduce the porosity of the materials used for terminal posts in such batteries has been a continuing problem in the battery industry. In recent years, relatively low porosity battery terminals have appeared on the material: however, the techniques and equipment for producing battery terminals in which the material is essentially pore free apparently have not been disclosed to the industry.

For many years, parts, of simple and complex geometry, have been formed by placing a cold or hot billet or slug of extrudable material within a mold or die cavity and then acting on the billet with an additional die member or members to cause it to extrude into the die cavity to form the desired part. For example, U.S. Pat. No. 1,410,093 issued to Dallmeyer et al discloses a method and apparatus for forming metal articles having variously shaped hubs and radially projecting flanges. Similarly, U.S. Pat. No. 1,213,878 issued to Jacocks discloses a forging apparatus in which a ring of material is placed within a die cavity and deformed by several concentric, independently movable die elements. U.S. Pat. No. 3,197,857 issued to Nippert discloses a method and apparatus for producing cup-shaped conductive parts in which a slug of material is first deformed into a cylindrical cup configuration; and then at a subsequent deforming station, provided with a radially extending flange. U.S. Pat. No. 3,731,516 issued to Dohmann et al discloses a method and apparatus for making bevel gears in which a pair of concentric die members are used to extrude material into a die cavity.

While apparatuses and methods for extruding parts of the general types shown in the previously described patents have been in use for many years, some recurrent problems appear to have gone unsolved by those working in the art. For example, once a part has been formed by extrusion of material into a die cavity, it is necessary to eject the part from the cavity by suitable means. This means has taken the form of plungers, air ejectors and other devices which complicate the apparatus considerably. Also, it is occasionally desired to attach a fixture of a different material to an exturded part, to adapt the part for a particular application. Often, the attachment of such a fixture has been achieved after the extruded part has been formed, thereby adding to the complexity of the manufacturing apparatus and method and increasing the cost of the completed part.

DISCLOSURE OF THE INVENTION

A primary object of the invention is to provide lead or lead-alloy battery terminals and to provide an apparatus and method for forming such terminals, in which the material in the completed terminal is essentially pore free.

An object of the present invention is to provide an improved apparatus and method for extruding parts of various types, which do not require the presence of complex ejector mechanisms or procedures.

A further object of the invention is to provide such an apparatus and method which include provision for capturing a fixture of harder material within the parts, an extrusion proceeds.

The present invention addresses the aforementional porosity problem by providing a part, such as a lead or lead-alloy battery terminal, which is essentially pore free. The term "essentially pore free" is generally intended to mean a part having no more than approximately 1 pore/cm$^2$ visible to the naked eye on the surface of a sectioned and polished specimen prepared by standard metallographic techniques. Such technique may be, for example, embedding the sample in epoxy, cutting the sample in sections with a metallographic diamond saw and etching the cut surface with an etchant solution composed of equal parts of acetic acid, 30% hydrogen peroxide and glycerine.

In accordance with a preferred embodiment of the invention, an apparatus is provided for extruding parts of the type having a body portion of extrudable material and a fixture of harder material captured at the surface of the body. A first die element is provided with a cavity having essentially the desired final geometry of the part and a first bore extending from the cavity. A second die element is positioned within the first bore, the second die element having an external geometry corresponding to that of the first bore. At the end of the second die element facing into the cavity, means are provided for holding a fixture of harder material to be captured in the part during extrusion. Thus, after a billet of extrudable material has been placed within the first bore and cavity, the second die element can be moved toward the cavity, thereby causing the material to extrude into the cavity to form the body portion and to extrude around a portion of the fixture held by the holding means to capture the fixture within the body portion. The fixture itself may comprise a threaded portion which extends outwardly from the body portion, in which case the holding means comprises a tapped bore in the end of the second die element facing into the cavity. Or, the fixture may comprise a cup-like element which is embedded in the body portion, in which case the holding means comprises a protrusion on the second die element on which the cup-like element is supported during extrusion.

The method according to the invention comprises the steps of providing a first die element having a cavity with essentially the desired final geometry of the part and a first bore extending from the cavity. A second die element is positioned within the first bore and a fixture of harder material is attached to the end of the second die element facing into the cavity. A billet of extrudable material is positioned within the cavity after which the second die element and the fixture are forced into contact with the billet, thereby causing it to extrude into the cavity to form the body portion and to extrude around a portion of the fixture to capture the fixture at the surface of the body portion. The part is then removed from the cavity and the fixture is detached from the second die element. The resultant part comprises a body portion of extrudable material and a fixture of harder material captured at the surface of the body by forcing the fixture into the material of the body as the body is extruded.

BRIEF DESCRIPTION OF THE DRAWING

FIGS. 1A and 1B show examples of extruded parts which can be manufactured using the disclosed apparatus and method.

FIG. 2 shows a fragmentary elevation section view of the apparatus, the elements being shown in the positions assumed prior to extrusion of a part.

FIG. 3 shows a view of the lower surface of one die element illustrated in FIG. 2.

FIGS. 4 and 5 show fragmentary elevation section views of an apparatus which is adapted to capture a fixture within the completed part.

BEST MODE FOR CARRYING OUT THE INVENTION

The following is a detailed description of the various embodiments of the invention, reference being made to the drawings in which like reference numerals identify like elements of structure in each of the several Figures.

FIGS. 1A and 1B show views of extruded parts of the type suitable for manufacture using the apparatus and method according to the invention. The illustrated part is a battery terminal 10 which may be made from a soft material such as lead or an alloy of lead; however, those skilled in the art will appreciate that other types of parts may be manufactured in accordance with the teachings of the present invention using any appropriate extrudable material. Terminal 10 includes an essentially cylindrical boss or body portion 12 which may have a variety of exterior geometries such as right cylindrical, elliptical, polygonal and the like. At the upper end of boss 12, as illustrated, a blind bore 14 is provided which may be for attachment of a further part or fixture such as a terminal post. Bore 14 may, if desired, be a through bore and may have other cross-sectional configurations than the illustrated circular configuration. At the lower end of boss 12, as illustrated, a radially extending arm element or portion 16 is formed integrally with boss 12. If desired, more than one such arm element may be provided and the arm element may be straight or bent as illustrated. To facilitate removal from the extrusion die, arm element 16 preferably has a flat bottom and an arbitrarily shaped upper surface which tapers inwardly from the edges of the bottom surface.

In FIG. 1B, a modified version of battery terminal 10 is shown in which bore 14 has been omitted and a fixture 18 of harder material has been captured below the upper surface of boss 12. Fixture 18 may be a simple flat-head brass machine screw which is captured at the surface of boss 12 during extrusion, particularly when a relatively soft material such as lead is used to form the part. The flat head 20 of fixture 18 may be replaced by a suitable grooved, knurled or otherwise roughened head which will prevent axial pr rotational movement of the fixture following extrusion.

As shown in FIGS. 2 and 3, the apparatus according to the invention comprises a female die element 22 which includes a rigid body 24 of suitable material such as steel. A cylindrical bore 26 extends through body 24 to the upper portion of a downwardly opening cavity 28, the upwardly extending walls of which have an essentially cylindrical geometry corresponding to the desired exterior geometry of boss 12. Cavity 28 may be defined, at least in part, by a slight downward and outward taper 30 which is provided in bore 26 to facilitate removal of the part following extrusion; however, this taper is not always required, as will be discussed. As illustrated, cavity 28 opens downwardly through the lower surface 32 of body 24. A radially directed passage 34 extends from cavity 28 and opens through surface 32, the side and upper surfaces of passage 34 having a geometry corresponding to the desired geometry of the upper surfaces of arm element 16. Passage 34 also may be tapered to facilitate removal of the part.

A cylindrical, male die element 36 is positioned within bore 26 for axial movement therein. An axial bore 38 may be provided centrally within die element 36 to receive a further male die element 40 having a downwardly projecting end portion 42 with a geometry corresponding to the desired geometry of blind bore 14. Beneath lower surface 32 of body 24 is positioned a support die 44 having an upper surface 46 which mates with lower surface 32 to support die element 22. Preferably, surfaces 32 and 46 are flat; however, they may have any convenient geometry.

To form a part of the type illustrated in FIG. 1A, a billet or slug 48 of a suitable extrudable material is placed within cavity 28 beneath the lower end of die elements 36 and 40. Die elements 36 and 40 are then forced downward, together or in any desired sequence, thereby causing the material of billet 48 to extrude downwardly and outwardly to fill cavity 28 and radial passage 34 to form the desired part. Air escapes through clearances between parts 26, 36, 38, 40, for example. Once the extrusion has been completed, die element 22 and support die 44 are separated, thereby permitting the completed part to be ejected from die element 22 by moving die element 40 upwardly and die element 36 downwardly. Although the use of separately movable die elements 36 and 40 is preferred to minimize the degree of taper 30 necessary for ease of part removal, those skilled in the art will appreciate that a single die element having an integral end portion or protrusion 42 at its lower end could also be used without departing from the scope of the present invention. Lead battery terminals made this way are essentially pore free.

FIGS. 4 and 5 show a modified version of the apparatus illustrated in FIGS. 2 and 3. This apparatus is adapted for capturing at the surface of the part a fixture of harder material, such as the screw element 18 shown in FIG. 1B. To achieve this, a tapped bore 50 is included in the bottom end of die element 36 to provide a means for holding the fixture 18 during extrusion. Alternatively, as shown in FIG. 5, a downwardly extending protrusion 52 may be provided on the bottom end of die element 36 for holding a cup-like fixture 54 having a knurled outside wall 56, as illustrated. Other means for holding the fixture also may be used such as magnetic or pneumatic devices and the like.

In operation of the embodiments shown in FIGS. 4 and 5, die element 36 is moved downwardly until the fixture 18, 20 or 54, 56 contacts billet 48 thereby causing the material of the billet to extrude into cavity 28 to form the body portion of the part and to extrude around at least a portion of the fixture 18, 20 or 54, 56 to capture the fixture at the surface of the body portion. Simultaneously, of course, the material also flows into radially extending passage 34, as previously described. Die elements 22 and 44 are then separated and the completed part is removed from the bottom end of die element 36.

Having described our invention in sufficient detail to enable those skilled in the art to make and use it, we claim:

1. A method of extruding a lead or lead alloy battery terminal of essentially pore-free material in which is captured a fixture comprised of a material harder than said lead or lead alloy, said fixture extending away from said battery terminal, said battery terminal having an essentially cylindrical boss and a radially extending arm element protruding from said boss, said method comprising:

providing a first die element having a rigid body with a cavity having the desired final geometry of said battery terminal cylindrical boss and a first bore extending from said cavity, said first die element further comprising a passage extending radially from said bore and having a geometry corresponding to the desired external geometry of said radially extending arm element;

providing a second die element disposed in contact with said first die element and defining therewith at least a portion of said cavity and a portion of said passage;

positioning within said first bore a third die element for axial movement therewithin and having an essentially cylindrical external geometry corresponding to the geometry of said first bore;

affixing said fixture of harder material to the end of the third die element facing toward said cavity;

positioning within said cavity a billet of material comprised substantially of lead, said material having a first porosity;

forcing said third die element and said fixture into contact with said billet thereby causing said material to extrude around said fixture affixed to said third die element to frictionally capture the fixture within said cylindrical boss and further causing said billet to extrude into said cavity to form said cylindrical boss, said forcing step further causing said billet to extrude into said passageway to form said radially extending arm element;

densifying said material of said first porosity by said forcing step sufficiently so as to provide a second porosity less than said first porosity and thereby provide an essentially pore-free battery terminal;

separating said first and second die element;

ejecting said terminal and said fixture from said cavity; and detaching said fixture from said third die element.

* * * * *